US010320462B2

(12) United States Patent
Palenius et al.

(10) Patent No.: US 10,320,462 B2
(45) Date of Patent: Jun. 11, 2019

(54) DOPPLER SHIFT OR DOPPLER SPREAD AS INPUT FOR BEAM-SWITCHING OR NODE-SWITCHING IN WIRELESS NETWORKS

(71) Applicant: Telefonaktiebolaget LM Ericsson (publ), Stockholm (SE)

(72) Inventors: Torgny Palenius, Barsebäck (SE); Magnus Sandgren, Staffanstorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/521,932

(22) PCT Filed: Jun. 7, 2016

(86) PCT No.: PCT/EP2016/062871
§ 371 (c)(1),
(2) Date: Apr. 26, 2017

(87) PCT Pub. No.: WO2017/211388
PCT Pub. Date: Dec. 14, 2017

(65) Prior Publication Data
US 2018/0191416 A1 Jul. 5, 2018

(51) Int. Cl.
*H04B 7/06* (2006.01)
*H04W 76/28* (2018.01)
(Continued)

(52) U.S. Cl.
CPC ............ *H04B 7/0617* (2013.01); *G01S 11/10* (2013.01); *H04B 7/0619* (2013.01);
(Continued)

(58) Field of Classification Search
CPC . H04L 1/0027; H04B 17/318; H04B 7/15507; H04B 7/2606; H04B 7/0617
(Continued)

(56) References Cited

U.S. PATENT DOCUMENTS 5,872,621 A * 2/1999 Wilkerson ............. G01S 17/95
356/28.5
6,680,969 B1 * 1/2004 Molnar .................. H04B 1/707
375/224
(Continued)

FOREIGN PATENT DOCUMENTS

CN 101998443 A 3/2011
WO 9300777 A1 1/1993
(Continued)

OTHER PUBLICATIONS

Song, Lei, et al., "Speed Estimation in Uplink Frequency Domain for Mobile OFDM Systems", IEEE/CIC ICCC 2014 Symposium on Signal processing for Communications, 2014, 5 pages.
(Continued)

*Primary Examiner* — Emmanuel Bayard
(74) *Attorney, Agent, or Firm* — Murphy, Bilak & Homiller, PLLC

(57) ABSTRACT

Techniques in a node of a wireless communications network, where one or more wireless devices are served via beams transmitted by network nodes. An example method comprises estimating (910), for a wireless device operating in the wireless communications network, a Doppler shift associated with movement of the wireless device, or a Doppler spread associated with movement of the wireless device, or both. The method further comprises, based on said estimating, evaluating (920) a change in estimated Doppler shift associated with the wireless device or evaluating the estimated Doppler spread associated with the wireless device, or both, and adjusting (930) at least one mobility-related parameter, based on said evaluating of the change in estimated Doppler or the evaluating of the estimated Doppler spread, or both. The method further comprises carrying (940) out one or more mobility procedures for the wireless
(Continued)

device, based on the adjusted at least one mobility-related parameter.

36 Claims, 9 Drawing Sheets

(51) Int. Cl.
  *G01S 11/10* (2006.01)
  *H04L 1/00* (2006.01)
(52) U.S. Cl.
  CPC .......... *H04B 7/0626* (2013.01); *H04W 76/28* (2018.02); *H04L 1/0027* (2013.01)
(58) Field of Classification Search
  USPC ................................. 375/267, 299, 347–349
  See application file for complete search history.

(56) References Cited

U.S. PATENT DOCUMENTS

| | | | | |
|---|---|---|---|---|
| 8,369,857 | B2* | 2/2013 | Dimou | H04W 64/006 |
| | | | | 455/441 |
| 2007/0049308 | A1* | 3/2007 | Lindoff | H04W 72/048 |
| | | | | 455/509 |
| 2007/0064641 | A1 | 3/2007 | Laroia et al. | |
| 2008/0187062 | A1* | 8/2008 | Pan | H04B 7/0417 |
| | | | | 375/260 |
| 2011/0069629 | A1 | 3/2011 | Breit et al. | |
| 2012/0052901 | A1* | 3/2012 | Zhu | H04L 1/0029 |
| | | | | 455/517 |
| 2012/0083299 | A1* | 4/2012 | Kruglick | H04B 7/01 |
| | | | | 455/501 |
| 2012/0099471 | A1* | 4/2012 | Brannstronn | H04L 1/0026 |
| | | | | 370/252 |
| 2012/0289233 | A1* | 11/2012 | Medbo | G01S 11/10 |
| | | | | 455/436 |
| 2013/0051485 | A1* | 2/2013 | Taori | H04L 27/2626 |
| | | | | 375/260 |
| 2013/0166113 | A1* | 6/2013 | Dakin | G01N 21/53 |
| | | | | 701/10 |
| 2014/0015713 | A1* | 1/2014 | Liu | G01S 19/09 |
| | | | | 342/357.69 |
| 2014/0128058 | A1* | 5/2014 | Ji | H04W 24/04 |
| | | | | 455/423 |
| 2014/0288867 | A1* | 9/2014 | Karlsson | G01C 21/165 |
| | | | | 702/96 |
| 2015/0024758 | A1* | 1/2015 | Quan | H04W 64/006 |
| | | | | 455/440 |
| 2015/0141021 | A1 | 5/2015 | Kapoulas et al. | |
| 2015/0312719 | A1* | 10/2015 | Cho | H04W 4/027 |
| | | | | 455/456.5 |
| 2017/0055938 | A1* | 3/2017 | Krasnow | A61B 8/085 |
| 2017/0261614 | A1* | 9/2017 | Lee | G01S 19/07 |
| 2017/0311188 | A1* | 10/2017 | Sun | H04L 5/0048 |

FOREIGN PATENT DOCUMENTS

| | | | | |
|---|---|---|---|---|
| WO | WO 2009058069 A1 * | 5/2009 | .......... | H04W 64/006 |
| WO | 2013067345 A1 | 5/2013 | | |

OTHER PUBLICATIONS

Zhang, Haijun, et al., "Cooperative Interference Mitigation and Handover Management for Heterogeneous Cloud Small Cell Networks", DRAFT, May 1, 2015, 19 pages.

* cited by examiner

DOPPLER SHIFT OR DOPPLER SPREAD AS INPUT FOR BEAM-SWITCHING OR NODE-SWITCHING IN WIRELESS NETWORKS

TECHNICAL FIELD

This disclosure is generally related to wireless communications, and is more particularly related to methods and apparatus for carrying out mobility procedures in wireless communications networks.

BACKGROUND

Initial development of wireless communications technology in the $3^{rd}$-Generation Partnership Project (3GPP) and other industry groups is underway for so-called fifth-generation wireless networks, often referred to as "5G." Among other possible developments is the use in 5G of directed beams for some or all of the communications between wireless devices and the radio access network. These directed beams may be formed by a network node for transmitting to wireless devices (i.e., for downlink transmissions), or for receiving transmissions from a wireless device (i.e., for uplink reception), or both. As a consequence, the cell-centric approach to mobility and other wireless network aspects may be replaced or augmented with a beam-centric approach.

One important issue that arises with the use of beams to serve wireless devices is mobility, i.e., the handling of wireless devices as they move from one location to another, such that they need to be served by different or differently-directed beams. Note that with a beam-based approach, mobility can be between different beams belonging to the same network node, or between beams belonging to two different network nodes. With a beam-centric approach to beam mobility, the wireless device (often referred to as a "user equipment," or "UE," in 3GPP documentation) may be unaware of whether or not the beams belong to the same network node.

In some cases, relatively narrow beams may be used to minimize interference, and to provide the best link conditions. However, the use of narrow beams also implies that the link may deteriorate rapidly outside the optimal beam configuration, especially in circumstances involving sudden shadowing, a fast moving user, and/or strong interfering beams. This may result in short time windows for performing a beam switch, i.e., a handover from one beam to another. In some situations, such as when a rapidly moving wireless device suddenly turns around a corner, for example, the beam switch can be quite time-critical, since the quality of the serving beam may drop very rapidly.

The time window for doing a beam switch can be defined as the time from when the serving beam is no longer the optimal beam to when it becomes too weak for decoding of control or data signaling. If the serving beam is lost, the wireless device will first go into an out-of-synch (OOS) condition, and eventually will declare a radio link failure (RLF) if no new serving beam is found. An RLF triggers a new search and acquisition process, which can interrupt and degrade ongoing voice and/or data sessions. Particularly short beam-switch time windows may be avoided to some degree in the cell planning process, by trying to avoid beam shadowing at least in areas where users are moving fast. However, a combination of narrow beamwidth and a fast moving user, in a direction tangential to the beam's primary axis, will nevertheless create short beam-switch time windows.

In this context, then, it will be appreciated that the system should preferably be designed to provide a maximum time for performing a beam switch that is less than the minimum beam-switching time window, or at least to ensure that the time needed for beam switching is almost always less than the beam-switching time window. The requirements driving the design of mechanisms for ensuring that beam-switching is quick enough will often be driven by mobility between downlink beams, since downlink measurement results are not available to the network until after a signaling delay for reporting the measurements.

SUMMARY

Embodiments of the presently disclosed techniques and apparatus include methods implemented in a node of a wireless communications network, where one or more wireless devices are served via beams transmitted by network nodes. An example method comprises estimating, for a wireless device operating in the wireless communications network, a Doppler shift associated with movement of the wireless device, or a Doppler spread associated with movement of the wireless device, or both. The method further comprises, based on said estimating, evaluating a change in estimated Doppler shift associated with the wireless device or evaluating the estimated Doppler spread associated with the wireless device, or both, and adjusting at least one mobility-related parameter, based on said evaluating of the change in estimated Doppler or the evaluating of the estimated Doppler spread, or both. The method further comprises carrying out one or more mobility procedures for the wireless device, based on the adjusted at least one mobility-related parameter.

Also disclosed are corresponding network nodes. An example network node is configured for operation in a node of a wireless communications network, where one or more wireless devices are served via beams transmitted by network nodes. The example network node is adapted to estimate, for a wireless device operating in the wireless communications network, a Doppler shift associated with movement of the wireless device, or a Doppler spread associated with movement of the wireless device, or both. The network node is further adapted to evaluate a change in estimated Doppler shift associated with the wireless device or evaluate the estimated Doppler spread associated with the wireless device, or both, based on said estimating, and to adjust at least one mobility-related parameter, based on said evaluating of the change in estimated Doppler or the evaluating of the estimated Doppler spread, or both. The network node is further adapted to carry out one or more mobility procedures for the wireless device, based on the adjusted at least one mobility-related parameter.

An example radio network node is configured for operation in a node of a wireless communications network, and comprises radio-frequency circuitry and antennas configured to serve one or more wireless devices via beams transmitted by the antennas. The example radio network node further comprises a processing circuit operatively connected to the radio-frequency circuitry and configured to: estimate, for a wireless device operating in the wireless communications network, a Doppler shift associated with movement of the wireless device, or a Doppler spread associated with movement of the wireless device, or both; evaluate a change in estimated Doppler shift associated with the wireless device or evaluate the estimated Doppler spread associated with the wireless device, or both, based on said estimating; adjust at least one mobility-related parameter, based on said evaluating of the change in estimated Doppler or the evaluating of the estimated Doppler spread, or both; and carry out one or more mobility procedures for the wireless device, based on the adjusted at least one mobility-related parameter.

DETAILED DESCRIPTION

Figure 1:
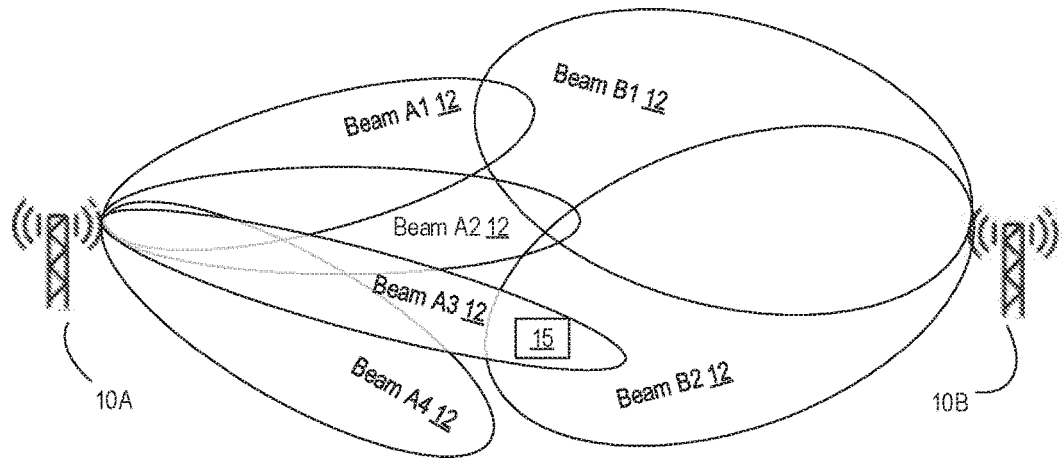
FIG. 1 is a simplified illustration of a network utilizing beams for serving wireless devices.

Although the solutions described above may be implemented in any appropriate type of system using any suitable components, particular embodiments of the described solutions may be implemented in a wireless network such as the example wireless communication network illustrated in FIG. 1. Generally speaking, a wireless communication network provides communication and other types of services to one or more wireless devices. In the simplified example shown in FIG. 1, the wireless communication network includes radio network nodes 10A and 10B, which are base stations or other access points that facilitate the wireless devices' access to and/or use of the services provided by the wireless communication network. An example wireless device 15 is also illustrated in FIG. 1. Although not shown in FIG. 1, the wireless communication network may further include any additional elements suitable to support communication between wireless devices or between a wireless device and another communication device, such as a landline telephone. Thus, for example, the radio network nodes 10A and 10B may be connected, directly or indirectly, to a so-called core network (not shown), which includes gateways to one or more public data networks (PDNs), such as the Internet, and/or to a public-switched telephone (PSTN).

The wireless communication network may represent any type telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

In the example shown in FIG. 1, wireless device 15, which may be a cellular telephone or a machine-type communications (MTC) device, for example, communicates with either or both of the radio network nodes 10A and 10B via one or more directed beams 12 formed by an array of antenna elements at or associated with the radio network nodes 10A and 10B. In the illustrated example, radio network node 10A is associated with four beams 12, labeled Beam A1, Beam A2, Beam A3, and Beam A4. Radio network node 10B is associated with two beams 12, labeled Beam B1 and Beam2. These beams may correspond to downlink transmissions, i.e., from a radio network node 10 to a wireless device, or to uplink transmissions, i.e., from a wireless device to a radio network node 10, or both.

As used herein, the term "wireless device" refers to a device configured, arranged and/or operable to communicate wirelessly with network equipment and/or another wireless device. In the present context, communicating wirelessly may involve transmitting and/or receiving wireless signals using electromagnetic signals, or, more specifically, radio waves. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

A wireless device may support device-to-device (D2D) communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein, the term "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations. Particular examples of radio base stations include Node Bs, and evolved Node Bs (eNBs). Base stations may be categorized based on the amount of coverage they provide (or, stated differently, their transmit power levels) and may then also be referred to as femto base stations, pico base stations, micro base stations, or macro base stations. "Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network equipment include multistandard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

As used herein, the term "radio network node" is used to refer to network equipment that includes radio capabilities. Thus, examples of radio network nodes are the radio base stations and radio access points discussed above. It will be appreciated that some radio network nodes may comprise equipment that is distributed—such as the distributed radio base stations (with RRHs and/or RRUs) discussed above. It will be appreciated that the various references herein to eNBs, eNodeBs, Node Bs, and the like are referring to examples of radio network nodes. It should be understood that the use of the word "node" denotes that the equipment referred to operates as a logical node in a network, but does not imply that all of the node's components are necessarily co-located.

As discussed above, a wireless communications system that uses directed beams to serve mobile terminals should be designed to provide a maximum time for performing a beam switch that is less than the minimum beam-switching time window, or at least to ensure that the time needed for beam switching is almost always less than the beam-switching time window. Again, the requirements driving the design of mechanisms for ensuring that beam-switching is quick enough will often be driven by mobility between downlink beams, since downlink measurement results are not available to the network until after a signaling delay for reporting the measurements.

This time needed for beam switching, which may be referred to as a beam-switch delay time, can be made shorter by doing more frequent measurements of link quality, and reducing the measurement and signaling delays. This may involve, for example, the use of adaptive parameter settings, doing preliminary tracking of candidate beams, or having multiple serving beams. Alternatively, the beam-switching time window can be made longer, e.g., by halting interfering signals at least in some resource blocks (RB). Another approach is to carry out the beam-switch procedure blindly, such that the beam-switch procedure can be completed even if the serving beam is lost.

The choice of which mobility mechanisms to use for avoiding loss of the serving beam and/or the decision as to when to trigger a particular mechanism may involve a tradeoff between the costs in radio resources of using the mechanisms, the risk of losing the serving beam for various mechanisms and/or various timings, and the required quality of service for the user. As a general matter, the radio resource cost for out-of-synch (OOS) procedures for recovering from a serving beam loss is likely to be significantly smaller than the cost for going through the complete process of setting up a radio link, as would be needed for a complete RLF.

High-Speed Mobile Terminals

"High-speed" can mean different things in different environments. If we assume the base station to be static, the Doppler shift ($\Delta f$) perceived by the base station for a radial UE velocity of $v_r$ is:

$$\Delta f = 2 \times f0 \times \frac{vr}{c}.$$

To prevent drift (and prolong holdover times), base stations are generally equipped with highly stable clock sources. Hence, base station frequency drift over a relatively short Doppler analysis window should be very small. For short durations, temperature variations can be assumed to dominate over clock-source aging and other effects.

If an oven voltage-controlled crystal oscillator (OVCXO) is used as the base station's clock source, a temperature drift rate of +/−0.002 ppm/° C. might be used assumed for analysis. The temperature drift rate will vary between products, but in most realistic cases can be assumed to be less than 0.1° C./s. If an observation period of less than one second is assumed, for simplicity, then frequency variations of less than 0.2 ppb (parts-per-billion) can be expected, which should be sufficient given that this corresponds to a relatively low radial speed of 0.11 km/h (0.03 m/s).

High speed for a mobile terminal can give rise to two different effects on the received signal. In a line-of-sight (LOS) scenario, where there is one dominating path received, the received signal will be frequency shifted by the Doppler frequency, fd, corresponding to the radial speed. Note that "radial" as used herein refers to directions parallel to the main axis of the serving beam. In a non-line-of-sight (NLOS) scenario, on the other hand, the signal does not propagate directly between the transmitter and receiver, but reflects off of one or more surfaces or physical features (buildings, bridges, etc.) before it reaches the receiver. In this case, the signal may be received from several directions at once, due to different reflections. In this case the received signal is not subjected to a simple frequency shift, but is instead spread in frequency, between +/−fd, where fd is the Doppler frequency. This is referred to as Doppler spread.

In the LOS scenario, the UE receives a downlink signal with a doppler offset of fd Hz. Since the UE is tracking the downlink Doppler frequency, the UE's transmitted signal will have a frequency offset of fd, relative to the downlink signal as transmitted by the base station. The received signal in the base station will then have a frequency offset of 2*fd, because of the Doppler shifting of the uplink signal. The Dopper frequency fd, and hence the mobile terminal's radial speed, can be estimated at the base station by estimating the frequency offset present in the received signal, based on the base station's internal clock frequency.

In the NLOS scenario, the mobile terminal's radial speed can be estimated by estimating the maximum Doppler spread, fd. This can be done, for example, by evaluating the autocorrelation of the received signal.

Since the UE tunes its frequency according to the signal received from the base station, and because the Doppler analysis period is generally small, and hence errors caused by UE clock drift are small. This means that the base station can generally have a good resolution in terms of measuring Doppler shifts caused by moving UEs. Through base station Doppler analysis, each UE served by a particular beam or network node can be categorized into classes corresponding to various levels of mobility and speeds. An example categorization is shown in Table 1.

TABLE 1

Example of mobility classes (LOS)

| Class | Example | Radial speed (km/h) | Doppler shift (ppb) |
|---|---|---|---|
| Very High | High speed trains | 200-500 | 371-927 |
| High | Highway vehicles | 80-200 | 148-371 |
| Mid | vehicles in city center | 30-80 | 56-148 |
| Low | Bike | 5-30 | 9.3-56 |
| Very low | Pedestrian | 1-5 | 1.85-9.3 |

In simple beam-switch algorithms, Doppler estimation is not taken into account. With this approach, the same rules and measurements can be used for a slow-speed UE as for a high-speed UE. However, the risk for Radio Link Failure (RLF) or Out-of-Service (OOS) conditions increases considerably for high-speed UEs.

Previously existing Doppler-based mobility algorithms are based on the traditional cell concept. However, in 5G networks or other networks using beam-based mobility, device mobility is between different beams belonging to a single radio network node, or between beams provided by different radio network nodes. This beam-based approach to mobility requires new solutions.

According to some embodiments of the techniques described herein, mobility issues are addressed by having a base station or other radio network node estimate the Doppler shift and Doppler spread of a wireless device, such as a UE, in order to estimate the speed of the wireless device. A sudden change in Doppler can be used as an indication of a likely change of direction for the wireless device, and thereby associated with an increased risk for the need for beam switching. In some embodiments, a sudden change in Doppler is considered together with a change in received signal strength, to determine that a need for beam switching is likely. The estimated speed and direction changes may then be used in mobility procedures, e.g., in the beam-switching algorithms. For example, the estimated speed and direction changes may be used to increase the measurement reporting, to refine handover candidate selection, and/or to decrease timers in order to speed up the mobility tracking for these UEs.

In some embodiments, these techniques have the advantage that measurement activities can be limited when mobility does not require measurements on many carriers in order to save power, while increasing measurement activities and thus providing for very good mobility when needed.

An advantage of several of the techniques described herein is that the techniques are based in the base station and/or other node in the radio access network. This allows the network to control the measurement rate in connected mode, for example, based on the estimated speed of the UE. Since information regarding the Doppler for a given mobile terminal is available in the base station receiver, it is generally preferred to perform the speed estimation in the base station.

The speed estimation can also be shared with other base stations or beams, e.g., when the connection is moved to a new base station. Thus, the measurement configuration used by the receiving base station or associated with the new beam can match the UE's speed from the time when the UE enters the coverage of the base station or beam.

The network also controls what discontinuous-receive (DRX) cycle is used for a given beam. In the event that there are many high-speed UEs in a beam, the longest DRX (and eDRX) cycles may not be suitable for the beam. Thus, in some embodiments, the DRX cycle for a wireless device or group of wireless devices may be adjusted, based on an estimated speed for the UE.

According to several of the embodiments disclosed herein, one or more mobility-related parameters for a wireless device are adjusted, based on an evaluation of a change in estimated Doppler shift for the wireless device, or based on an evaluation of a Doppler spread associated with the wireless device, or both. For example, a wireless device in connected mode can, based on real-time Doppler analysis and/or an analysis of Doppler shifts or maximum Doppler shifts over time, be configured in any of several different ways. For instance, the network can prioritize the speed of beam switching (or handover) for high-mobility wireless devices and make early necessary preparations, since beam-switch/handover is more likely to happen quickly. The network can also avoid making a switch of a high-mobility user to a base station with a small cell radius, for example.

As an example of mobility-related parameters that may be adjusted, wireless devices may be configured with different measurement rates depending on Doppler speed, changes in Doppler, and/or Doppler spread. Other examples include different reporting periods and/or different times to trigger before a measurement is taken into account for a beam switch. With these adjustments, the beam-switch can be done much more quickly for a UE moving at high speed than for a UE moving at a lower speed. Since the high-speed UE moves more quickly, the risk of the ping-pong effect for switches between beams (or cells) decreases with the speed, but there is a need for quicker reactions to weaker signal.

During handover, or beam-switch, of a UE between beams, whether intra-node or inter-node, measured Doppler is evaluated as part of the handover process in several of the techniques described herein. Doppler analysis can be performed and used in real time, and/or can be based on previous measurements, e.g., for classification of a specific UE's mobility. Note that the Doppler analysis may use data that is shared between base stations, in some embodiments.

Note also that a given UE can have different mobility classifications for different base stations (even at the same time), depending on where it is positioned and how it is moving relative to the base stations.

While many of the techniques herein involve evaluation of changes in Doppler shift and/or evaluation of Doppler spread over short periods of time, e.g., over seconds, or fractions of seconds, it should be noted that recognizing patterns over different parts of the day or week could be useful, in some implementations of the techniques described herein. Since many people have some form of regularity and predictability in the way they move around, e.g., commuting between home and work, such mobility profiling can be used in many circumstances to give good future mobility predictions.

Figure 2:
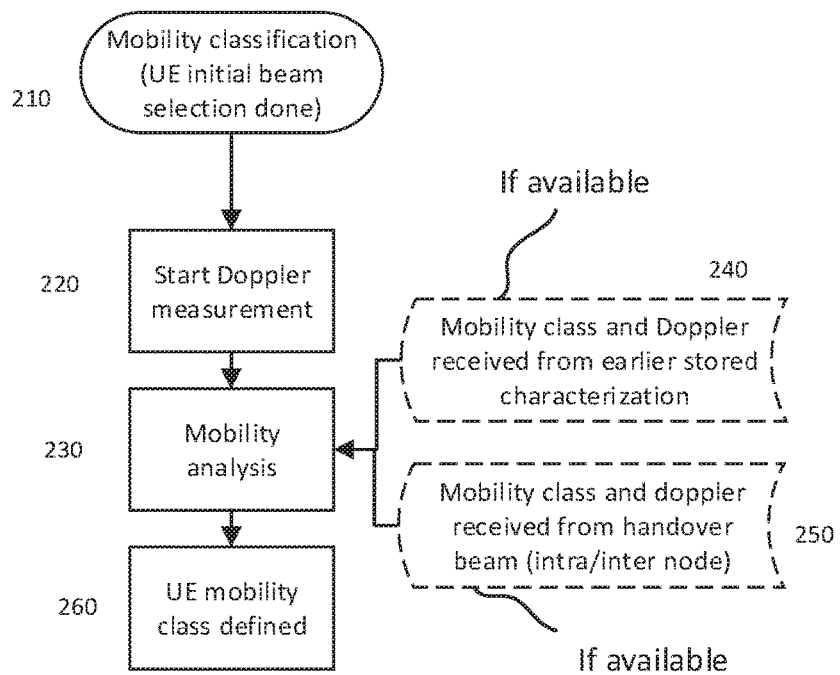
FIG. 2 illustrates an example mobility classification process.

In some of the Doppler-based beam-loss mitigation techniques described above, a mobility classification process is included—the results of this mobility classification process may trigger subsequent evaluation and/or mobility-related actions based on evaluations of changes in Doppler frequency or based on Doppler spread, for example. FIG. 2 illustrates an example of a mobility classification process. As shown at block 210, the example mobility classification process begins after an initial beam selection for a given wireless device is done. As shown at block 220, a Doppler measurement for the wireless device is begun. Based on the Doppler measurement, which may be used to estimate a radial speed for the wireless device, for example, a mobility analysis is performed, as shown at block 230. This analysis is generally based on evaluating one or several Doppler measurements and/or a Doppler spread for the wireless device. In some embodiments, a mobility classification and/or Doppler information from an earlier stored profile of the wireless device may be used in the mobility analysis, as shown at block 240. In some embodiments, a mobility classification and/or Doppler information received from another node and/or associated with another beam (whether intra-node or inter-node) may be used in the mobility analysis, as shown at block 250. Finally, as shown at block 260, a mobility classification is assigned to the wireless device. This mobility classification may be one of several predetermined classifications, in some embodiments, such as a classification into one of the five classes shown in Table 1, above. In other embodiments, the mobility classification may be represented by one or several numeric parameters.

UE mobility classification, alone or in combination with other evaluation of estimated Doppler frequency and/or Doppler spread, can be used in beam mobility processes or node handover processes, e.g., to prioritize high mobility UEs and make early necessary preparations since handover are more likely to happen fast. In one example, a beam mobility process or node handover process avoids handover of wireless devices classified as "high mobility" to a base station having a small cell radius.

Figure 3:
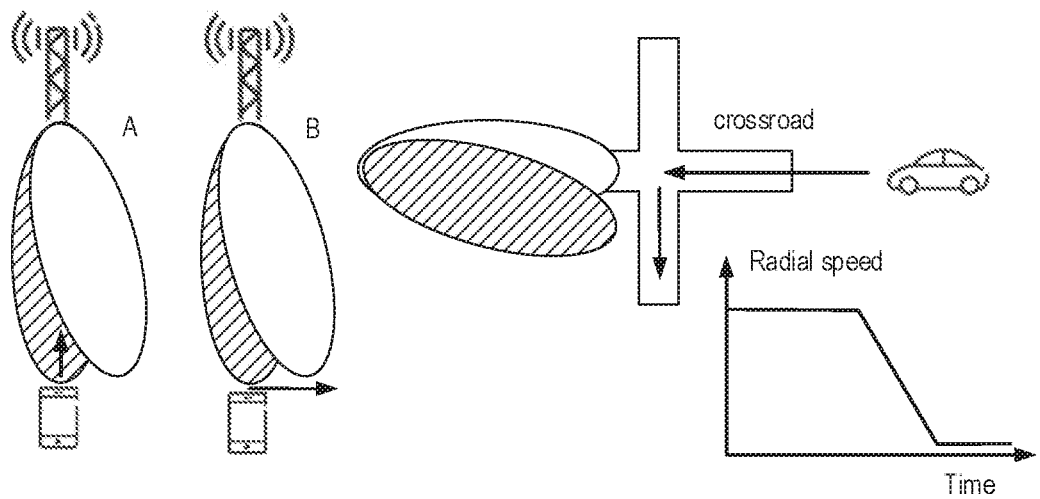
FIG. 3 illustrates the impact of radial speed versus tangential speed in a network that uses beams.

In a LOS scenario, as discussed above, the motion of the UE shows up as a simple frequency shift in the signal transmitted by the wireless device, as received at the base station. This frequency shift is a result of the wireless device's motion as projected onto the straight line between the base station and the wireless device; thus, only the radial speed of the wireless device can be estimated from this frequency shift. As suggested by part "A" of FIG. 3, however, a high radial speed as such may not be particularly harmful with respect to a beam switch or node switch, since the radial speed of the wireless device reflects that component of the wireless device's motion that is aligned with the beam. Thus, a high radial speed could correspond to a user that is moving directly towards the base station or beam, and that will stay within the beam for some time.

However, a high radial speed for a wireless device means that the wireless device is capable of moving at high speeds. A wireless device moving at a high radial speed may suddenly change direction, in which case it might quickly move out of the beam. Such a change in direction, however, will also generally result in a corresponding change in Doppler shift, as the radial component of the wireless device's speed changes. A sudden change in Doppler shift for a wireless device, particularly when that wireless device initially has a high radial speed, can thus serve as an indicator of a change in direction, corresponding with an increased risk for needing a fast beam switch or node switch. Changes in received signal strength can also be evaluated, together with an evaluation of changes in Doppler shift, to identify a likely change in direction with a corresponding high risk for a fast beam/node switch.

As suggested above, a sudden change in Doppler shift for a wireless device, e.g., as detected over two or a relatively small number of consecutive estimates of Doppler shift, can be used to determine that a need for beam switch or node switch is likely imminent. A related approach also involves the evaluation of changes in estimated Doppler shift for a wireless device, but involve the comparison of estimated Doppler shift for a given wireless device to a previously determined maximum line-of-sight (LOS) Doppler shift for the wireless device. This maximum LOS Doppler shift for the wireless device may be based on historical Doppler shift data for the wireless device—this historical Doppler shift data may be collected by the same node that performs the evaluation, or may be received from another node, in various embodiments. A maximum LOS Doppler shift may be determined from a combination of one or more Doppler shifts estimated by one node and data received from another node, in some embodiments.

In any case, in some embodiments of the techniques described herein, an estimated Doppler shift for a wireless device is evaluated with respect to a predetermined estimate of maximum Doppler shift for the wireless device, to determine whether there is a high risk that a beam switch or node switch will soon be needed. This evaluation may comprise, for example, by taking a measured or estimated Doppler shift for the wireless device and dividing it by a stored estimate of the maximum Doppler shift for the wireless device. If the result is less than a certain ratio, this could indicate a large tangential speed, with a high risk that beam switching or node switching will soon be needed.

Figure 4:
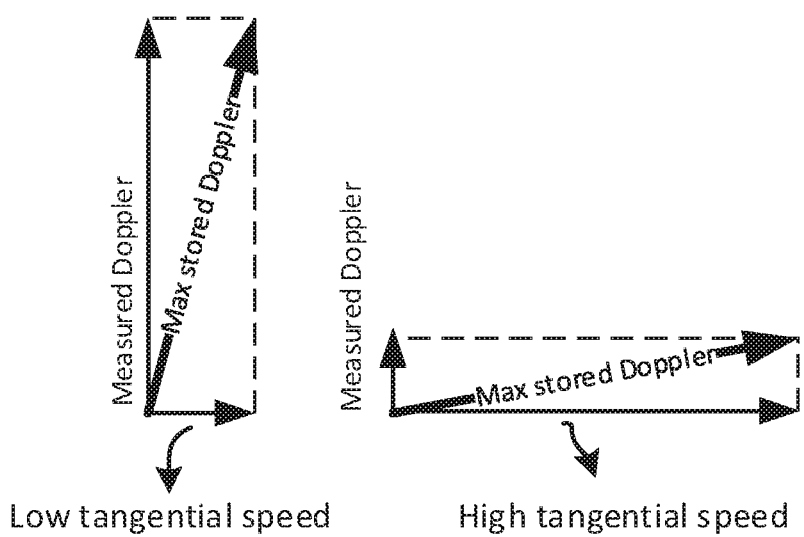
FIG. 4 shows the relationship between tangential speed and a stored maximum Doppler shift for a wireless device.

More generally, it should be appreciated that this particular calculation and comparison is equivalent to comparing the estimated Doppler shift to a predetermined fraction of the stored estimate of the maximum Doppler shift for the wireless device. Note that "tangential speed" refers to that component of the wireless device's velocity that is orthogonal to the axis of the beam or, alternatively, that is orthogonal to the LOS propagation path between the wireless device and base station. To the extent that the wireless device's actual speed is relatively constant, a low Doppler shift relative to the maximum Doppler shift for the wireless device is suggestive that a significant component of the wireless device's motion is tangential, and is thus indicative of a higher likelihood of an imminent need for a beam switch or node switch, as compared to the presence of a high Doppler estimate alone. This is shown in FIG. 4, which illustrates how measured Doppler compares to a stored maximum Doppler, for cases of low tangential speed and high tangential speed, respectively.

In a NLOS scenario, a large Doppler spread for a wireless device indicates that the wireless device is a fast-moving device, in any direction. In this case, it is not possible to separate tangential speed from radial speed, in the Doppler evaluation, since the Doppler spread is independent of the direction. In this case, the base station can, when it recognizes that a wireless device has a large Doppler spread indicate of a rapidly moving device, instead evaluate changes in propagation delay per time unit (e.g., change of timing advance combined with change of received uplink timing), to estimate the radial speed. When the wireless device is close to the base station, the propagation delay from the UE to the base station (and vice versa) is smaller than when the wireless device is far from the base station—thus, changes in the propagation delay over a given unit of time are directly proportional to the wireless device's radial speed, relative to the base station. By comparing the Doppler spread to the trend of change of propagation delay, both the radial and tangential speed can be estimated. The tangential speed is a high proportion of the device's overall speed when the Doppler spread is high but there is no change or only small changes in the propagation delay; conversely, the radial speed is high when the Doppler spread is high and there are relatively large changes in the propagation delay over time.

A common situation that arises when base stations are using narrow beams is that there is a LOS component that is affected by a Doppler shift and there is also a component of fading Doppler-spread signal coming from reflections. In this scenario, it is possible to estimate the overall speed of the wireless device by the Doppler spread of the NLOS component and the radial speed of the wireless device from the Doppler shift of the LOS component. From these two estimates, the tangential speed can be estimated.

Statistics of the Doppler analysis over a period of time, e.g., an hour, a day, or a week, can also be used when configuring a wireless device. Based on the history, the wireless device can be configured with a particular set of mobility-related parameters that take the Doppler history into account, such as the period for mobility measurements.

A first example of a use of the techniques described above is in a scenario where a wireless device is in connected mode and receiving and transmitting signals in a beam. Any time the wireless device is in connected mode it is, at least occasionally, transmitting, and receiving signals to/from a base station. Therefore, the base station is able to estimate the Doppler frequency-shift on the LOS component of the received signal, and thereby the radial speed, from the uplink signal received from the UE. The network is also receiving measurement reports from the wireless, reporting downlink signal level and signal quality. In LTE systems, for example, these measurement reports comprise reports of Reference Signal Received Power (RSRP) and Reference Signal Received Quality (RSRQ); in 5G networks and other networks there will be similar or other corresponding measurement reports.

Figure 5:
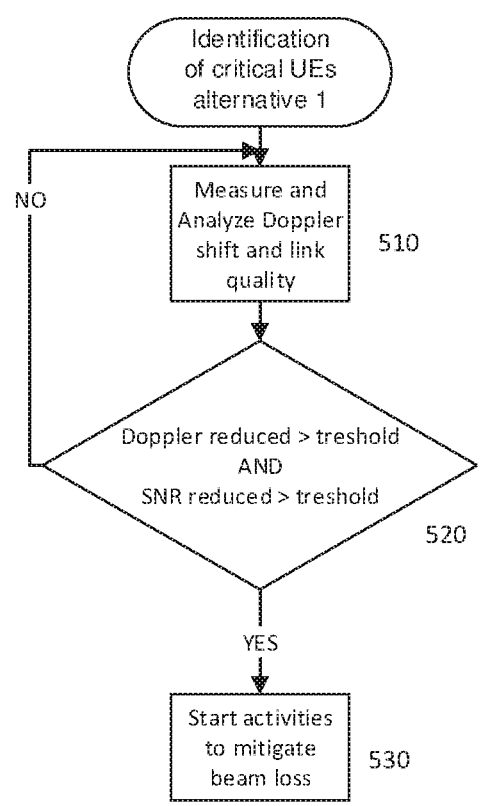
FIGS. 5, 6, 7, 8, and 9 are process flow diagrams illustrating example processes for evaluating Doppler shift and/or Doppler spread and undertaking activities to mitigate and/or reduce the likelihood of beam loss.

FIG. 5 illustrates an example method for identifying wireless devices that have an increased risk of sudden beam loss, and that correspondingly are likely to soon need a beam switch or node switch. Note that this method, and several of the other techniques detailed below, can be combined with the mobility classification processes discussed above, such that, for example, a determination that a wireless device falls into a certain class of group of classes triggers the process shown in FIG. 5.

As shown at block 510, the process includes measuring and analyzing Doppler shift and link quality for a wireless device. Doppler shift can be measured/estimated in the wireless network by comparing the frequency of a transmission received from the wireless device to an expected frequency, based on the clock of the receiving base station (or other radio access node). Link quality may be measured/estimated from measurements reported by the wireless device, as discussed above.

As shown at block 520, the process further includes comparing a detected change in Doppler (indicated in FIG. 5 as a reduction in Doppler shift) to a first threshold, as well as comparing a change (reduction) in signal-to-noise ratio (SNR) for the wireless device to another threshold. If the change in Doppler shift is greater than the first threshold and the change in SNR is greater than the second threshold, then activities to mitigate or reduce the likelihood of beam loss can be taken, as shown at block 530. Otherwise, the process repeats, with subsequent measurements of Doppler and link quality.

The mitigation activities may be any of several different types. In some embodiments, one or more mobility-related parameters are adjusted, based on the determination (as shown at block 520) that there is an increased likelihood of beam loss or beam switching. These mobility-related parameters may include, for example, a measurement reporting period or rate for the wireless device, or modifications in the time-to-trigger parameters used by the device to determine when to report measurements to the network—in these examples, the adjusted parameters are communicated to the wireless devices. In other examples, the width of a beam serving the wireless device may be adjusted, to reduce the probability of beam switching or loss, or a list of candidate beams or nodes for handover/switching may be refined, based on the Doppler evaluation.

An alternative approach, which utilizes a stored max Doppler for tangential speed estimates, as described earlier is shown in FIG. 6. This method also uses Doppler shift, such as obtained in a LOS scenario, or a mixed LOS/NLOS scenario. Again, this method can be combined with the mobility classification processes discussed above, such that, for example, a determination that a wireless device falls into a certain class of group of classes triggers the process shown in FIG. 6. As will be seen, the process in FIG. 6 includes elements of the process of FIG. 5.

As shown at block 610, the process includes measuring and analyzing Doppler shift and link quality for a wireless device. Again, Doppler shift can be measured/estimated in the wireless network by comparing the frequency of a transmission received from the wireless device to an expected frequency, based on the clock of the receiving base station (or other radio access node). Link quality may be measured/estimated from measurements reported by the wireless device, as discussed above.

As shown at block 620, the process further includes comparing the measured/estimated Doppler shift to a predefined fraction of a stored maximum Doppler shift for the wireless device. As indicated in the figure, if the measured/estimated Doppler shift is less than this predefined fraction, this indicates a potentially high tangential speed. In this case, then, activities to mitigate or reduce the risk of beam loss are undertaken as shown at block 640.

Otherwise, the process continues with comparing a detected change in Doppler (indicated in FIG. 6 as a reduction in Doppler shift) to a first threshold, as well as comparing a change (reduction) in signal-to-noise ratio (SNR) for the wireless device to another threshold. This is essentially the same as the step shown as block 520 of FIG. 5. If the change in Doppler shift is greater than the first threshold and the change in SNR is greater than the second threshold, then activities to mitigate or reduce the likelihood of beam loss can be taken, as shown at block 640. Otherwise, the process repeats, with subsequent measurements of Doppler and link quality.

Once again, the mitigation activities may be any one or more of several different types, as discussed above in connection with FIG. 5.

Another approach may be used when there are both LOS and NLOS components, e.g., Rician fading. In this scenario, both the radial speed and the total speed can be estimated. From these, the tangential speed which is very important for narrow-beam systems, can be calculated. FIG. 7 illustrates an example of this approach. Once more, this method can be combined with the mobility classification processes discussed above, such that, for example, a determination that a wireless device falls into a certain class of group of classes triggers the process shown in FIG. 7. It should also be understood that this approach may be used along with the approaches shown in FIGS. 5 and 6, or selectively used, depending on the presence of an NLOS component in the Doppler analysis, in a base station or other network node that is configured to selectively use one of several different processes, depending on the Doppler characteristics.

As shown at block 710, the illustrated method includes measuring/estimating and analyzing Doppler shift, from the LOS component of a signal(s) received from the wireless device, as well as Doppler spread, from the NLOS component of the signal(s) received from the wireless device. A link quality is also analyzed, e.g., using measurement reports from the wireless device.

As shown at block 720, the method continues by comparing the Doppler shift to the Doppler spread. If the Doppler shift is much less than the Doppler spread (e.g., less than a predetermined fraction of the width of the Doppler spread), this indicates a high tangential speed for the wireless device. In this case, then, activities to mitigate beam loss or to reduce the risk of beam loss are initiated, as shown at block 730. Otherwise, measurements and analysis are repeated.

Once more, the mitigation activities may be any one or more of several different types, as discussed above in connection with FIG. 5.

Figure 8:
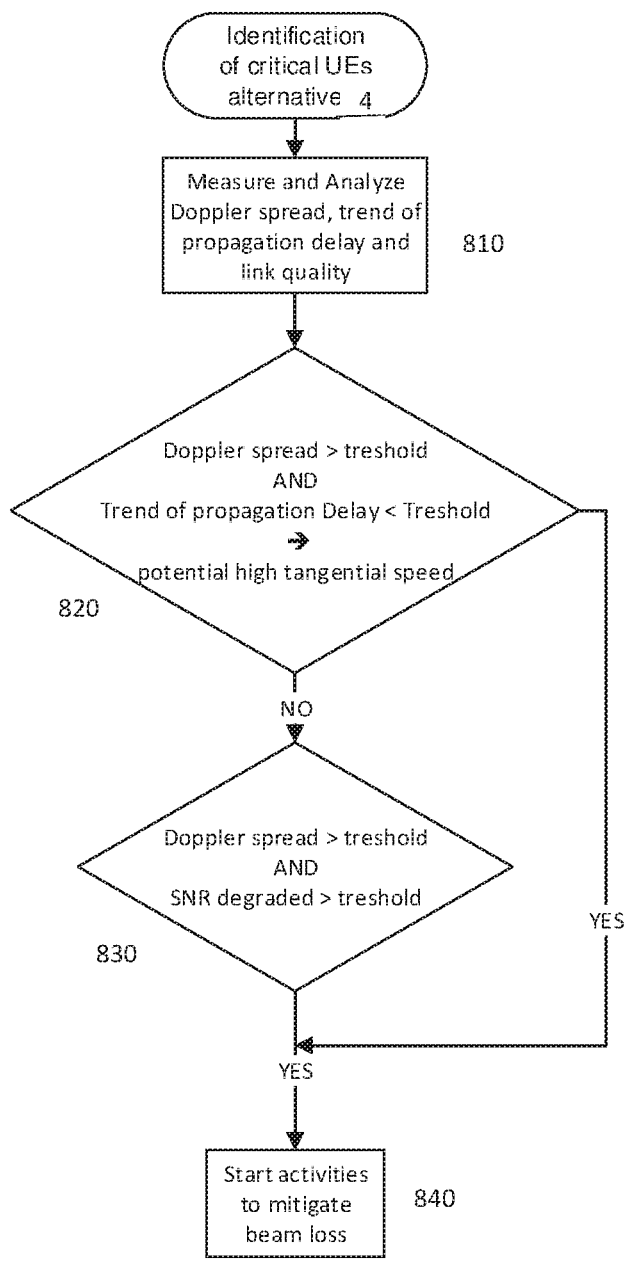

FIG. 8 shows an example process that might be carried out in a scenario where only NLOS components of a received signal are received, meaning that only a Doppler spread can be estimated. In this case the tangential speed is estimated by measuring the Doppler spread and the trend of change of propagation delay as described above. Again, this method can be combined with the mobility classification processes discussed above, such that, for example, a determination that a wireless device falls into a certain class of group of classes triggers the process shown in FIG. 8. Again, this approach may be used along with the approaches shown in FIGS. 5, 6, and/or 7, or selectively used, depending on the presence of an NLOS component in the Doppler.

As shown at block 810, the method includes measuring/estimating and analyzing Doppler spread, as well as measuring/estimating a trend in propagation delay, i.e., changes in propagation delay over time, as was discussed above. The link quality is also estimated and analyzed, again using measurement reports from the wireless device, for example.

As shown at block 820, the method includes determining whether the Doppler spread is greater than a first threshold and whether the trend of propagation delay is less than a threshold. If these two conditions are met, this indicates a potentially high tangential speed, for the reasons discussed above. In this case, then, activities to mitigate beam loss or reduce the likelihood of beam loss are undertaken, as shown at block 840.

Otherwise, as shown at block 830, the process continues with comparing a detected change in Doppler (indicated in FIG. 8 as a reduction in Doppler shift) to a third threshold, as well as comparing a change (reduction) in signal-to-noise ratio (SNR) for the wireless device to a fourth threshold. This is essentially the same as the step shown as block 520 of FIG. 5. If the change in Doppler shift is greater than the third threshold and the change in SNR is greater than the fourth threshold, then activities to mitigate or reduce the likelihood of beam loss can be taken, as shown at block 840. Otherwise, the process repeats, with subsequent measurements of Doppler and link quality.

As discussed above, the mitigation activities to mitigate/prevent beam loss can be any of several types, including adjustments to mobility-related parameters. As was discussed above, the network generally controls the measurement configuration in the wireless devices—the processes shown in FIGS. 5-8 and described above may trigger adjustments to one or more mobility-related parameters that define these measurement configurations.

5G networks may have an option to vary the rate of the downlink reference symbols that are used to measure the beam quality and thereby the rate of quality measurements. When fixed beams are used the network can thereby, in order to mitigate beam loss, control any one or more of the following, for example:

The measurement rates per UE, or based on estimated speed vector (velocity and direction).
Time to Triggers of the measurement events per UE or based on estimated speed vector.
Thresholds for measurement events
Priority in UE of finding other beams and cells on any RAT
The list of inter-frequency and inter-RAT carriers to search on.
The beam-width of the narrow beam to a fast UE—the beam width could be widened at the cost of lower gain.
Tracking of candidate beams for redundancy.
Halting interference in used resource blocks.

When beam tracking per wireless device is used instead of fixed beams, the network can control the dynamics of the beam tracking, with the same methodology as for fixed beams above. There will be handovers between beams also for beam-tracking where the same approaches described above can be used.

The network can, using the techniques described above, set configurations for high-speed wireless devices that differ from those used for low- or medium-speed UEs. This can especially be useful in areas where there are problems with radio link failures, due to changing environments, etc. For narrow-beam systems where the coverage is more sensitive to tangential speeds than to radial speeds, it is useful to be able to separate tangential and radial speed estimates in order to focus on UEs that have a high tangential speed in order to mitigate a loss of that UE when it is about to leave the beam very fast.

In some embodiments, the network can collect speed statistics in the cell and change measurement configurations for wireless devices based at least in part on the collected statistics. The statistics may differ in different time of the day and therefore the configurations may change over time.

In some embodiments, the network can recognize a specific wireless device that is connected to the cell every day. Then, it may know what speed it previously had, and set the measurement configuration for the wireless device based at least in part on this historical speed data for the wireless device.

As suggested above, speed estimation can also be shared within the wireless network, e.g., between base stations— when a wireless device is handed over to the next cell or beam, the speed can be signaled to the next base station, for example. In this manner, the receiving base station knows that it is handling a high-speed wireless device from the beginning.

Figure 9:
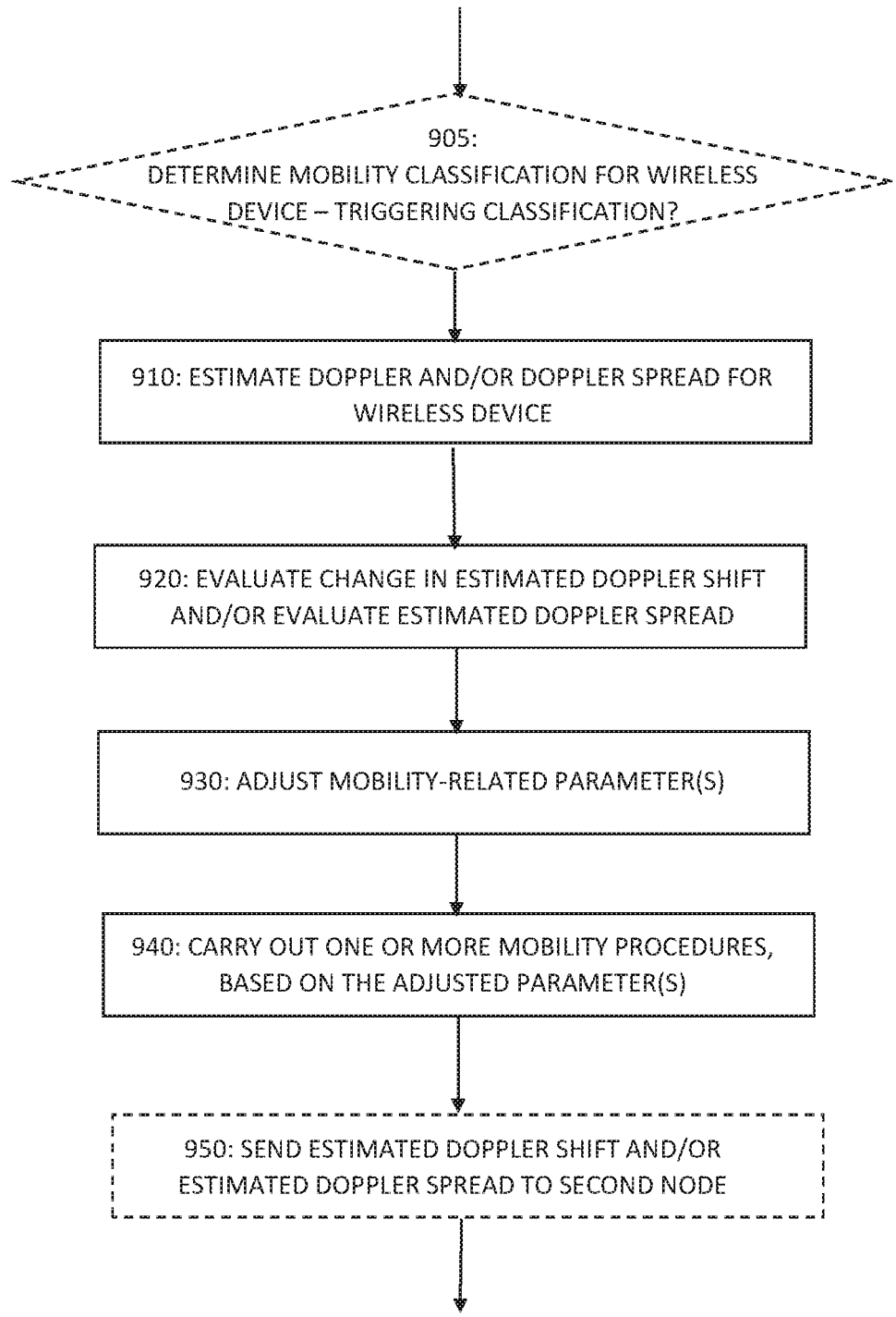

In view of the several techniques detailed above, it will be appreciated that the process flow diagram of FIG. 9 illustrates a generalized method, implemented in a node of a communications network where one or more wireless devices are served via one or more beams transmitted by network nodes, where the illustrated method comprises one or several of the techniques detailed above.

As shown at block 910, the illustrated method includes estimating, for a wireless device operating in the wireless communications network, a Doppler shift associated with movement of the wireless device, or a Doppler spread associated with movement of the wireless device, or both. As shown at block 920, the method further comprises evaluating a change in estimated Doppler shift associated with the wireless device or evaluating the estimated Doppler spread associated with the wireless device, or both, based on the estimating shown in block 910.

The method further includes, as shown at block 930, adjusting at least one mobility-related parameter, based on said evaluating of the change in estimated Doppler or the evaluating of the estimated Doppler spread, or both. As shown at block 940, one or more mobility procedures are carried out for the wireless device, based on the adjusted at least one mobility-related parameter.

In some embodiments, carrying out the one or more mobility procedures comprises sending the at least one mobility-related parameter to the wireless device to configure mobility measurements by the wireless device. The mobility-related parameter or parameters may comprise, for example one or more of: a mobility measurement rate for the wireless device; a measurement reporting interval for the wireless device; a measurement evaluation threshold for the wireless device; and a time-to-trigger parameter related to mobility measurements by the wireless device. In some of these or in some other embodiments, carrying out the one or more mobility procedures may comprise selecting a target beam or target cell for handing over the wireless device, based on the adjusted at least one mobility-related parameter.

In some embodiments, adjusting the at least one mobility-related parameter comprises adjusting a width of a beam serving the wireless device. This adjusting of the width of the beam serving the wireless device may be based on an estimated tangential speed for the wireless device, relative to a direction of the beam, in some embodiments.

In some embodiments, the method further comprises prioritizing beam-switching operations and/or handover operations for the wireless device, relative to corresponding operations for other wireless devices, based on the adjusted at least one mobility-related parameter. In some embodiments, the method further comprises determining a discontinuous receive (DRX) interval for a beam serving the wireless device, based on the adjusted at least one mobility-related parameter.

Figure 6:
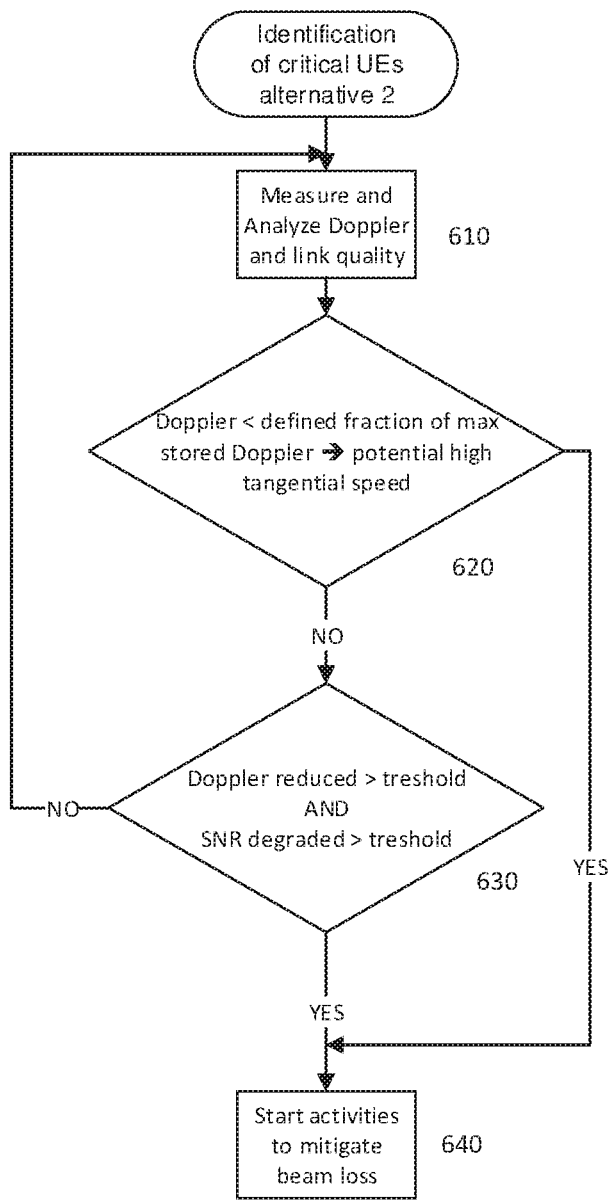
Figure 7:
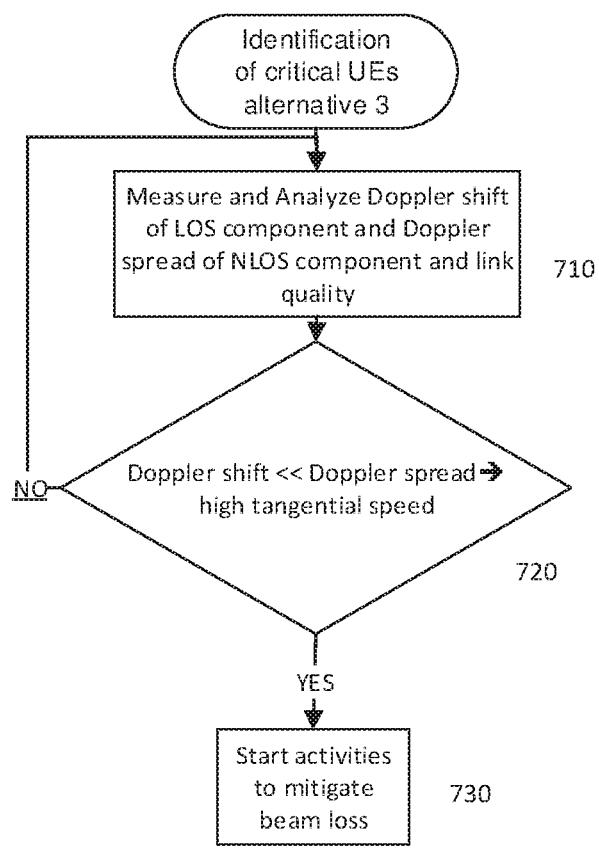

In some embodiments, evaluating the change in estimated Doppler shift comprises determining whether a difference between the estimated Doppler shift and a previously estimated Doppler shift exceeds a first threshold, e.g., as was shown at block 520 of FIG. 5 and block 630 of FIG. 6. In these embodiments, the adjusting of the at least one mobility-related parameter is triggered, at least in part, in response to determining that the difference is greater than the first threshold. In some embodiments, evaluating the change in estimated Doppler shift comprises determining whether the estimated Doppler shift is less than a predetermined fraction of a stored parameter representing an estimated maximum Doppler shift for the wireless device, e.g., as was shown at block 620 of FIG. 6. In these embodiments, adjusting the at least one mobility-related parameter is triggered, at least in part, in response to determining that the estimated Doppler shift is less than the predetermined fraction of the stored parameter. Any of these embodiments may further comprise detecting a change in a signal quality associated with the wireless device, e.g., as discussed above in connection with FIGS. 5 and 6, where the adjusting of the at least one mobility-related parameter is triggered further in response to detecting the change in the signal quality.

In some embodiments, the method comprises comparing the estimated Doppler shift to a predetermined fraction of the estimated Doppler spread, e.g., as shown at block 720 of FIG. 6. In these embodiments, adjusting the at least one mobility-related parameter is triggered at least in part in response to determining that the estimated Doppler shift is less than the predetermined fraction of the stored parameter.

In some embodiments of the method illustrated in FIG. 9, the adjusting of the at least one mobility-related parameter is triggered in response to determining that the estimated Doppler spread is greater than a first predetermined threshold and that a change or rate of change in propagation delay between the wireless device and a network node is less than a second predetermined threshold. This corresponds to block 820 of the example process shown in FIG. 8.

In some embodiments, the adjusting of the at least one mobility-related parameter is triggered in response to determining that the estimated Doppler spread is greater than a first predetermined threshold and that a change in a signal quality associated with the wireless device is greater than a second predetermined threshold. This corresponds to block 830 of the example process shown in FIG. 8.

As discussed above, estimated Doppler shift and/or estimated Doppler spread may be shared among network nodes. Accordingly, some embodiments of the method illustrated in FIG. 9 include sending the estimated Doppler shift or estimated Doppler spread, or both, to a second node in the wireless network. This is shown at block 950, which is illustrated with a dashed outline to indicate that this operation may not appear in every embodiment or instance of the illustrated method. this sending may be performed in conjunction with a handover of the wireless device to a cell or beam provided by the second node, in some embodiments or instances.

In some embodiments, the method further comprises determining a mobility classification for the wireless device, based on one or more estimated Doppler shifts and/or an estimated Doppler spread associated with the wireless device. This is shown at block 905, which is also illustrated with a dashed outline to show that it need not be present in every instance or embodiment of the illustrated embodiments. In these embodiments, the evaluating of the change in estimated Doppler shift associated with the wireless device or the evaluating of the estimated Doppler spread associated with the wireless device, or both, is triggered based on the determined mobility classification. Determining the mobility classification is based on one or more estimates of radial speed for the wireless device, based on one or more estimated Doppler shifts associated with the wireless device. Determining the mobility classification may be further based on mobility information for the wireless device received from another network node, in some embodiments, where this mobility information comprises at least one of: a prior estimated Doppler shift for the wireless device, a prior estimated Doppler spread for the wireless device, and a prior mobility classification for the wireless device.

Figure 10:
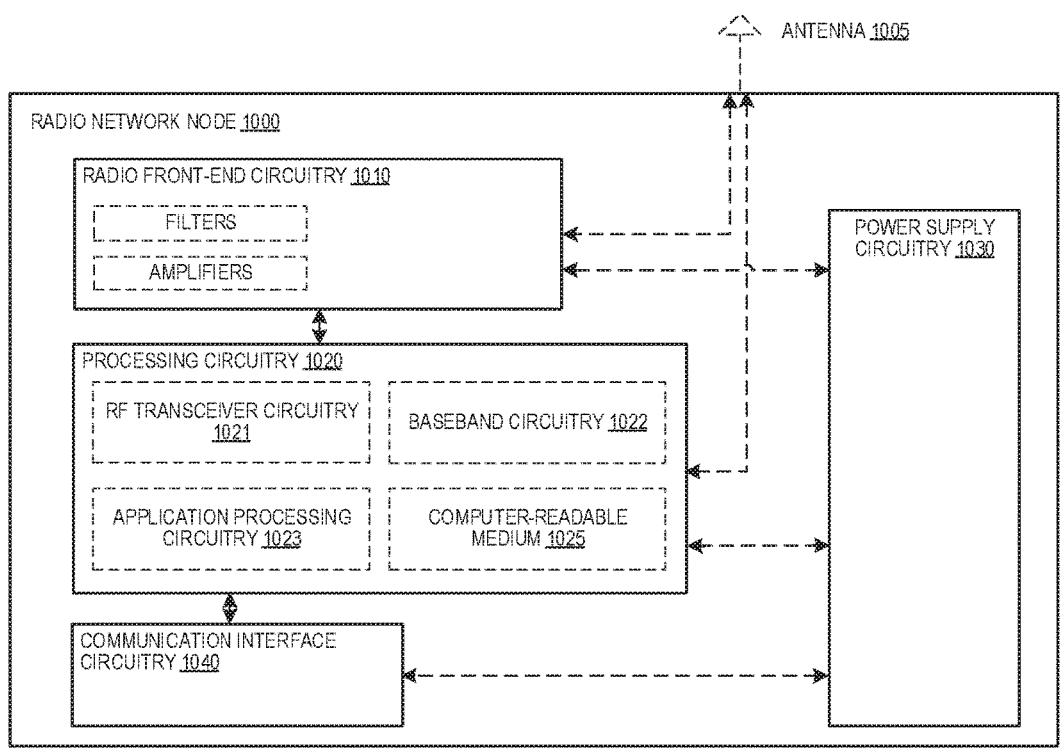
FIGS. 10 and 11 are block diagrams illustrating an example radio network node.

Any one or more of the several techniques described herein and/or illustrated in FIGS. 5-9, as well as variants thereof, may be embodied in a radio network node configured to carry out the one or several techniques. While a radio network node may include any suitable combination of hardware and/or software, an example radio network node 1000 is illustrated in greater detail by FIG. 10. As shown in FIG. 10, example radio network node 1000 includes an antenna 1005, radio front-end circuitry 1010, and processing circuitry 1020, which in the illustrated example includes a computer-readable storage medium 1025, e.g., one or more memory devices. Antenna 1005 may include one or more antennas or antenna arrays, and is configured to send and/or receive wireless signals, and is connected to radio front-end circuitry 1010. In certain alternative embodiments, radio network node 1000 may not include antenna 1005, and antenna 1005 may instead be separate from radio network node 1000 and be connectable to radio network node 1000 through an interface or port. In some embodiments, all or parts of radio front-end circuitry 1010 may be located at one or several locations apart from the processing circuitry 1020, e.g., in a RRH or RRU. Likewise, portions of processing circuitry 1020 may be physically separated from one another. Radio network node 1000 may also include communication interface circuitry 1040 for communicating with other network nodes, e.g., with other radio network nodes and/or with nodes in a core network.

Radio front-end circuitry 1010, which may comprise various filters and amplifiers, for example, is connected to antenna 1005 and processing circuitry 1020 and is configured to condition signals communicated between antenna 1005 and processing circuitry 1020. In certain alternative embodiments, radio network node 1000 may not include radio front-end circuitry 1010, and processing circuitry 1020 may instead be connected to antenna 1005 without radio front-end circuitry 1010. In some embodiments, radio-frequency circuitry 1010 is configured to handle signals in multiple frequency bands, in some cases simultaneously.

Processing circuitry 1020 may include one or more of radio-frequency (RF) transceiver circuitry 1021, baseband processing circuitry 1022, and application processing circuitry 1023. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central CPUs, one or more microprocessors, one or more ASICs, and/or one or more field FPGAs.

In particular embodiments, some or all of the functionality described herein as being relevant to radio network nodes, radio base stations, eNBs, etc., may be embodied in radio network node 1000 or, as an alternative may be embodied by the processing circuitry 1020 executing instructions stored on a computer-readable storage medium 1025, as shown in FIG. 10. In alternative embodiments, some or all of the functionality may be provided by the processing circuitry 1020 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 1020 alone or to other components of the radio network node, but are enjoyed by the radio network node 1000 as a whole, and/or by end users and the wireless network generally.

The processing circuitry 1020 may be configured to perform any determining operations described herein. Determining as performed by processing circuitry 1020 may include processing information obtained by the processing circuitry 1020 by, for example, converting the obtained information into other information, comparing the obtained information or converted information to information stored in the radio network node, and/or performing one or more operations based on the obtained information or converted information, and as a result of said processing making a determination.

Antenna 1005, radio front-end circuitry 1010, and/or processing circuitry 1020 may be configured to perform any transmitting operations described herein. Any information, data and/or signals may be transmitted to any network equipment and/or a wireless device. Likewise, antenna 1005, radio front-end circuitry 1010, and/or processing circuitry 1020 may be configured to perform any receiving operations described herein as being performed by a radio network node. Any information, data and/or signals may be received from any network equipment and/or a wireless device.

Computer-readable storage medium 1025 is generally operable to store instructions, such as a computer program, software, an application including one or more of logic, rules, code, tables, etc. and/or other instructions capable of being executed by a processor. Examples of computer-readable storage medium 1025 include computer memory (for example, RAM or ROM), mass storage media (for example, a hard disk), removable storage media (for example, a CD or a DVD), and/or any other volatile or non-volatile, non-transitory computer-readable and/or computer-executable memory devices that store information, data, and/or instructions that may be used by processing circuitry 1020. In some embodiments, processing circuitry 1020 and computer-readable storage medium 1025 may be considered to be integrated.

Alternative embodiments of the radio network node 1000 may include additional components beyond those shown in FIG. 10 that may be responsible for providing certain aspects of the radio network node's functionality, including any of the functionality described herein and/or any functionality necessary to support the solution described above. As just one example, radio network node 1000 may include input interfaces, devices and circuits, and output interfaces, devices and circuits. Input interfaces, devices, and circuits are configured to allow input of information into radio network node 1000, and are connected to processing circuitry 1020 to allow processing circuitry 1020 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from radio network node 1000, and are connected to processing circuitry 1020 to allow processing circuitry 1020 to output information from radio network node 1000. For example, output interfaces, devices, or circuits may include a speaker, a display, a USB port, a headphone interface, or other output elements. Using one or more input and output interfaces, devices, and circuits, radio network node 1000 may communicate with end users and/or the wireless network, and allow them to benefit from the functionality described herein.

As another example, radio network node 1000 may include power supply circuitry 1030. The power supply circuitry 1030 may comprise power management circuitry. The power supply circuitry 1030 may receive power from a power source, which may either be comprised in, or be external to, power supply circuitry 1030. For example, radio network node 1000 may comprise a power source in the form of a battery or battery pack which is connected to, or integrated in, power supply circuitry 1030. Other types of power sources, such as photovoltaic devices, may also be used. As a further example, radio network node 1000 may be connectable to an external power source (such as an electricity outlet) via an input circuitry or interface such as an electrical cable, whereby the external power source supplies power to power supply circuitry 1030.

Power supply circuitry 1030 may be connected to radio front-end circuitry 1010, processing circuitry 1020, and/or computer-readable storage medium 1025 and be configured to supply radio network node 1000, including processing circuitry 1020, with power for performing the functionality described herein.

Radio network node 1000 may also include multiple sets of processing circuitry 1020, computer-readable storage medium 1025, radio circuitry 1010, antenna 1005 and/or communication interface circuitry 1040 for different wireless technologies integrated into radio network node 1000, such as, for example, GSM, WCDMA, LTE, NR, WiFi, or Bluetooth wireless technologies. These wireless technologies may be integrated into the same or different chipsets and other components within radio network node 1000.

One or more instances of the radio network node 1000 may be adapted to carry out some or all of the techniques described herein, in any of various combinations. It will be appreciated that in a given network implementation, multiple instances of radio network node 1000 will be in use. In some cases, several instances of radio network node 1000 at a time may be communicating with or transmitting signals to a given wireless device or group of wireless devices. Thus, it should be understood that while many of the techniques described herein may be carried out by a single instance of radio network node 1000, these techniques may be understood as carried out by a system of one or more instances of radio network node 1000, in some cases in a coordinated fashion. The radio network node 1000 shown in FIG. 10 is thus the simplest example of this system.

In some embodiments, for example, one or more instances of radio network node 1000, and in particular the processing circuitry 1020 in such radio network node 1000, e.g., using an antenna 1005 and radio front-end circuitry 1010, is configured or adapted: to estimate, for a wireless device operating in the wireless communications network, a Doppler shift associated with movement of the wireless device, or a Doppler spread associated with movement of the wireless device, or both; to evaluate a change in estimated Doppler shift associated with the wireless device or evaluate the estimated Doppler spread associated with the wireless device, or both, based on the estimated Doppler shift and/or Doppler spread; to adjust at least one mobility-related parameter, based on said evaluating of the change in estimated Doppler or the evaluating of the estimated Doppler spread, or both; and to carry out one or more mobility procedures for the wireless device, based on the adjusted at least one mobility-related parameter. The radio network node 1000 or, more particularly, the processing circuit 1020 in such radio network node 1000, may be further configured or adapted to carry out any of the various techniques described above and/or illustrated in FIGS. 5-9.

Figure 11:
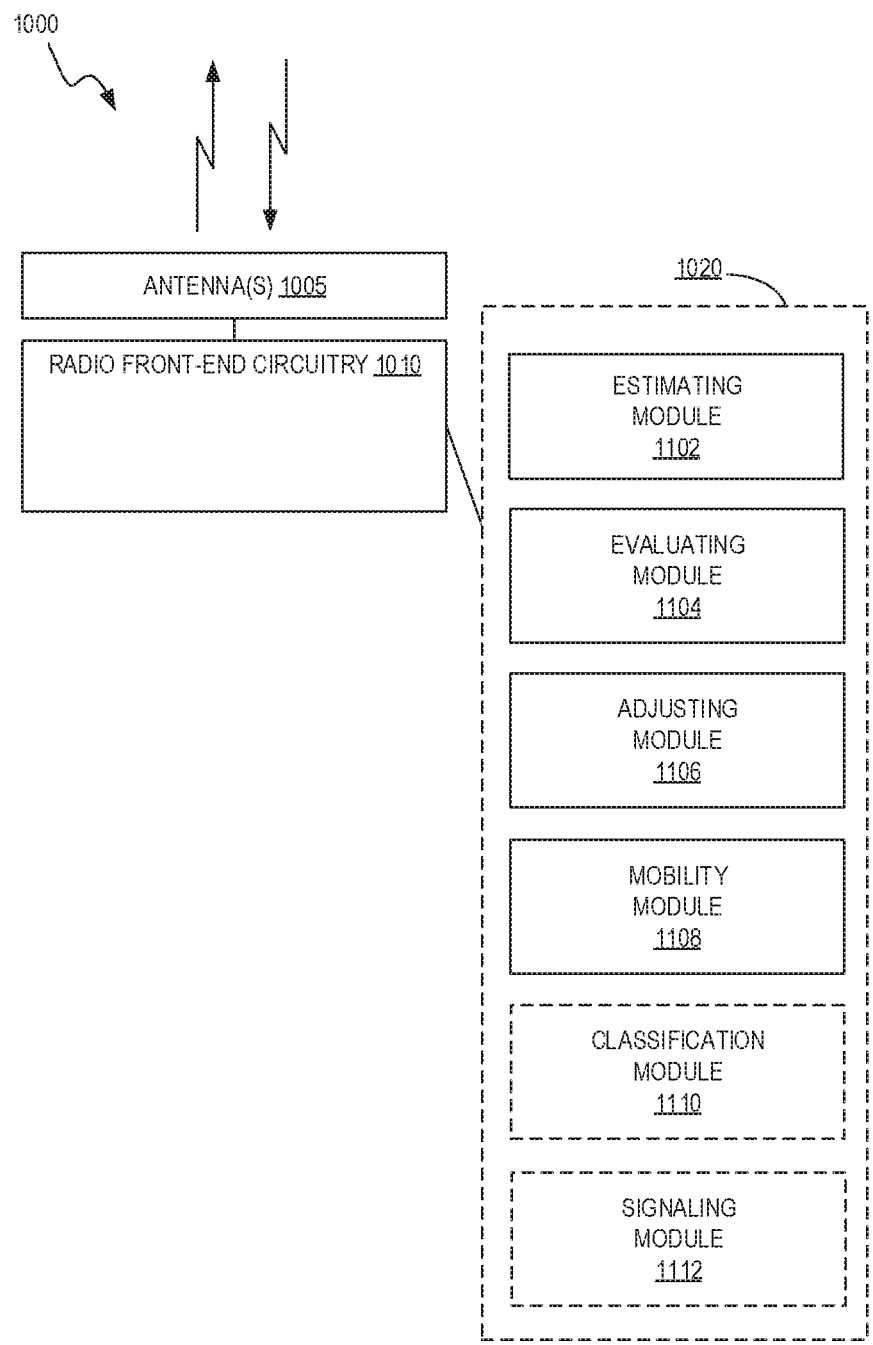

It will be appreciated that the example radio network node 1000 shown in FIG. 10 may alternatively be understood as comprising a number of functional units or modules, with each functional unit or module corresponding to one or several of the various operations described above. These functional units may correspond to software modules executed by processing circuit 1020, for example, or to hard-coded digital logic modules, or some combination thereof. FIG. 11 illustrates example radio network node 1000 comprising such functional modules. As seen in the figure, radio network node 1000 comprises: an estimating module 1102 for estimating, for a wireless device operating in the wireless communications network, a Doppler shift associated with movement of the wireless device, or a Doppler spread associated with movement of the wireless device, or both; an evaluating module 1104 for evaluating a change in estimated Doppler shift associated with the wireless device or evaluating the estimated Doppler spread associated with the wireless device, or both, based on the estimated Doppler shift and/or Doppler spread; an adjusting module 1106 for adjusting at least one mobility-related parameter, based on said evaluating of the change in estimated Doppler or the evaluating of the estimated Doppler spread, or both; and a mobility module 1108 for carrying out one or more mobility procedures for the wireless device, based on the adjusted at least one mobility-related parameter. Radio network node 1000 may further comprise a classification module 1110 for determining a mobility classification for the wireless device, based on one or more estimated Doppler shifts and/or an estimated Doppler spread associated with the wireless device, and/or a signaling module 1112 for sending the estimated Doppler shift or estimated Doppler spread, or both, to a second node in the wireless network. It will be appreciated that the specific operations implemented by these modules may be adapted according to any of the variants of the techniques described above.

Several methods and apparatuses have been described in detail above, including numerous examples and several variations. It should be appreciated that the inventive techniques and apparatuses thereby disclosed herein are not limited by any one of the particular examples provided above. Rather, the present invention is limited only by the claims appended hereto.

The invention claimed is:
1. A method, in a radio network node of a wireless communications network wherein one or more wireless devices are served via one or more beams transmitted by network nodes, the method comprising:
estimating, for a wireless device operating in the wireless communications network, a Doppler spread associated with movement of the wireless device;
based on said estimating, evaluating the estimated Doppler spread associated with the wireless device;
adjusting at least one mobility-related parameter, based on said evaluating of the estimated Doppler spread; and
carrying out one or more mobility procedures for the wireless device, based on the adjusted at least one mobility-related parameter.

2. The method of claim 1, wherein carrying out the one or more mobility procedures comprises sending the at least one mobility-related parameter to the wireless device to configure mobility measurements by the wireless device, and wherein the at least one mobility-related parameter comprises one or more of:
a mobility measurement rate for the wireless device;
a measurement reporting interval for the wireless device;
a measurement evaluation threshold for the wireless device; and
a time-to-trigger parameter related to mobility measurements by the wireless device.

3. The method of claim 1, wherein carrying out the one or more mobility procedures comprises selecting a target beam or target cell for handing over the wireless device, based on the adjusted at least one mobility-related parameter.

4. The method of claim 1, wherein adjusting the at least one mobility-related parameter comprises adjusting a width of a beam serving the wireless device.

5. The method of claim 4, wherein adjusting the width of the beam serving the wireless device is based on an estimated tangential speed for the wireless device, relative to a direction of the beam.

6. The method of claim 1, wherein the method further comprises prioritizing beam-switching operations and/or handover operations for the wireless device, relative to corresponding operations for other wireless devices, based on the adjusted at least one mobility-related parameter.

7. The method of claim 1, wherein the method further comprises determining a discontinuous receive (DRX) interval for a beam serving the wireless device, based on the adjusted at least one mobility-related parameter.

8. The method of claim 1, wherein the method further comprises estimating a Doppler shift associated with movement of the wireless device and determining whether a difference between the estimated Doppler shift and a previously estimated Doppler shift exceeds a first threshold, and wherein said adjusting the at least one mobility-related parameter is triggered, at least in part, in response to determining that the difference is greater than the first threshold.

9. The method of claim 8, further comprising detecting a change in a signal quality associated with the wireless device, and wherein said adjusting the at least one mobility-related parameter is triggered further in response to detecting the change in the signal quality.

10. The method of claim 1, wherein the method further comprises estimating a Doppler shift associated with movement of the wireless device and determining whether the estimated Doppler shift is less than a predetermined fraction of a stored parameter representing an estimated maximum Doppler shift for the wireless device, and wherein said adjusting the at least one mobility-related parameter is triggered, at least in part, in response to determining that the estimated Doppler shift is less than the predetermined fraction of the stored parameter.

11. The method of claim 1, wherein the method further comprises estimating a Doppler shift associated with movement of the wireless device and comparing the estimated Doppler shift to a predetermined fraction of the estimated Doppler spread, and wherein said adjusting the at least one mobility-related parameter is triggered at least in part in response to determining that the estimated Doppler shift is less than the predetermined fraction of the estimated Doppler spread.

12. The method of claim 1, wherein said adjusting the at least one mobility-related parameter is triggered in response to determining that the estimated Doppler spread is greater than a first predetermined threshold and that a change or rate of change in propagation delay between the wireless device and a network node is less than a second predetermined threshold.

13. The method of claim 1, wherein said adjusting the at least one mobility-related parameter is triggered in response to determining that the estimated Doppler spread is greater than a first predetermined threshold and that a change in a signal quality associated with the wireless device is greater than a second predetermined threshold.

14. The method of claim 1, further comprising sending the estimated Doppler spread, to a second node in the wireless network.

15. The method of claim 14, wherein said sending is performed in conjunction with a handover of the wireless device to a cell or beam provided by the second node.

16. The method of claim 1, wherein the method further comprises determining a mobility classification for the wireless device, based on one or more estimated Doppler shifts and/or an estimated Doppler spread associated with the wireless device, and wherein evaluating the estimated Doppler spread associated with the wireless device, or both, is triggered based on the determined mobility classification.

17. The method of claim 16, wherein determining the mobility classification is based on one or more estimates of radial speed for the wireless device, based on one or more estimated Doppler shifts associated with the wireless device.

18. The method of claim 16, wherein determining the mobility classification is further based on mobility information for the wireless device received from another network node, the mobility information comprising at least one of: a prior estimated Doppler shift for the wireless device, a prior estimated Doppler spread for the wireless device, and a prior mobility classification for the wireless device.

19. A radio network node configured for operation in a node of a wireless communications network, where the radio network node comprises:
radio-frequency circuitry and antennas configured to serve one or more wireless devices via beams transmitted by the antennas; and
a processing circuit operatively connected to the radio-frequency circuitry and configured to:
estimate, for a wireless device operating in the wireless communications network, a Doppler spread associated with movement of the wireless device;
evaluate the estimated Doppler spread associated with the wireless device, based on said estimating;
adjust at least one mobility-related parameter, based on said evaluating of the estimated Doppler spread; and
carry out one or more mobility procedures for the wireless device, based on the adjusted at least one mobility-related parameter.

20. The radio network node of claim 19, wherein the processing circuit is configured to carry out the one or more mobility procedures by sending the at least one mobility-related parameter to the wireless device to configure mobility measurements by the wireless device, and wherein the at least one mobility-related parameter comprises one or more of:
- a mobility measurement rate for the wireless device;
- a measurement reporting interval for the wireless device;
- a measurement evaluation threshold for the wireless device; and
- a time-to-trigger parameter related to mobility measurements by the wireless device.

21. The radio network node of claim 19, wherein the processing circuit is configured to carry out the one or more mobility procedures by selecting a target beam or target cell for handing over the wireless device, based on the adjusted at least one mobility-related parameter.

22. The radio network node of claim 19, wherein the processing circuit is configured to adjust the at least one mobility-related parameter by adjusting a width of a beam serving the wireless device.

23. The radio network node of claim 22, wherein the processing circuit is configured to adjust the width of the beam serving the wireless device based on an estimated tangential speed for the wireless device, relative to a direction of the beam.

24. The radio network node of claim 19, wherein the processing circuit is configured to prioritize beam-switching operations and/or handover operations for the wireless device, relative to corresponding operations for other wireless devices, based on the adjusted at least one mobility-related parameter.

25. The radio network node of claim 19, wherein the processing circuit is configured to determine a discontinuous receive (DRX) interval for a beam serving the wireless device, based on the adjusted at least one mobility-related parameter.

26. The radio network node of claim 19, wherein the processing circuit is further configured to estimate a Doppler shift associated with movement of the wireless device and determine whether a difference between the estimated Doppler shift and a previously estimated Doppler shift exceeds a first threshold, and wherein the processing circuit is configured to adjust the at least one mobility-related parameter, at least in part, in response to determining that the difference is greater than the first threshold.

27. The radio network node of claim 26, wherein the processing circuit is further configured to detect a change in a signal quality associated with the wireless device, and wherein the processing circuit is configured to adjust the at least one mobility-related parameter further in response to detecting the change in the signal quality.

28. The radio network node of claim 19, wherein the processing circuit is further configured to estimate a Doppler shift associated with movement of the wireless device and determine whether the estimated Doppler shift is less than a predetermined fraction of a stored parameter representing an estimated maximum Doppler shift for the wireless device, and wherein the processing circuit is configured to adjust the at least one mobility-related parameter, at least in part, in response to determining that the estimated Doppler shift is less than the predetermined fraction of the stored parameter.

29. The radio network node of claim 19, wherein the processing circuit is further configured to estimate a Doppler shift associated with movement of the wireless device and compare the estimated Doppler shift to a predetermined fraction of the estimated Doppler spread, and wherein the processing circuit is configured to adjust the at least one mobility-related parameter at least in part in response to determining that the estimated Doppler shift is less than the predetermined fraction of the estimated Doppler spread.

30. The radio network node of claim 19, wherein the processing circuit is configured to adjust the at least one mobility-related parameter in response to determining that the estimated Doppler spread is greater than a first predetermined threshold and that a change or rate of change in propagation delay between the wireless device and a network node is less than a second predetermined threshold.

31. The radio network node of claim 19, wherein the processing circuit is configured to adjust the at least one mobility-related parameter in response to determining that the estimated Doppler spread is greater than a first predetermined threshold and that a change in a signal quality associated with the wireless device is greater than a second predetermined threshold.

32. The radio network node of claim 19, wherein the processing circuit is configured to send the estimated Doppler spread, to a second node in the wireless network.

33. The radio network node of claim 32, wherein the processing circuit is configured to perform said sending in conjunction with a handover of the wireless device to a cell or beam provided by the second node.

34. The radio network node of claim 19, wherein the processing circuit is configured to determine a mobility classification for the wireless device, based on one or more estimated Doppler shifts and/or an estimated Doppler spread associated with the wireless device, and wherein the processing circuit is configured to evaluate the estimated Doppler spread associated with the wireless device, based on the determined mobility classification.

35. The radio network node of claim 34, wherein the processing circuit is configured to determine the mobility classification based on one or more estimates of radial speed for the wireless device, based on one or more estimated Doppler shifts associated with the wireless device.

36. The radio network node of claim 34, wherein the processing circuit is configured to determine the mobility classification based further on mobility information for the wireless device received from another network node, the mobility information comprising at least one of: a prior estimated Doppler shift for the wireless device, a prior estimated Doppler spread for the wireless device, and a prior mobility classification for the wireless device.

* * * * *